JOHN T. BASSETT.
Improvement in Steam Actuated Car Brakes.
No. 119,913. Patented Oct. 17, 1871.
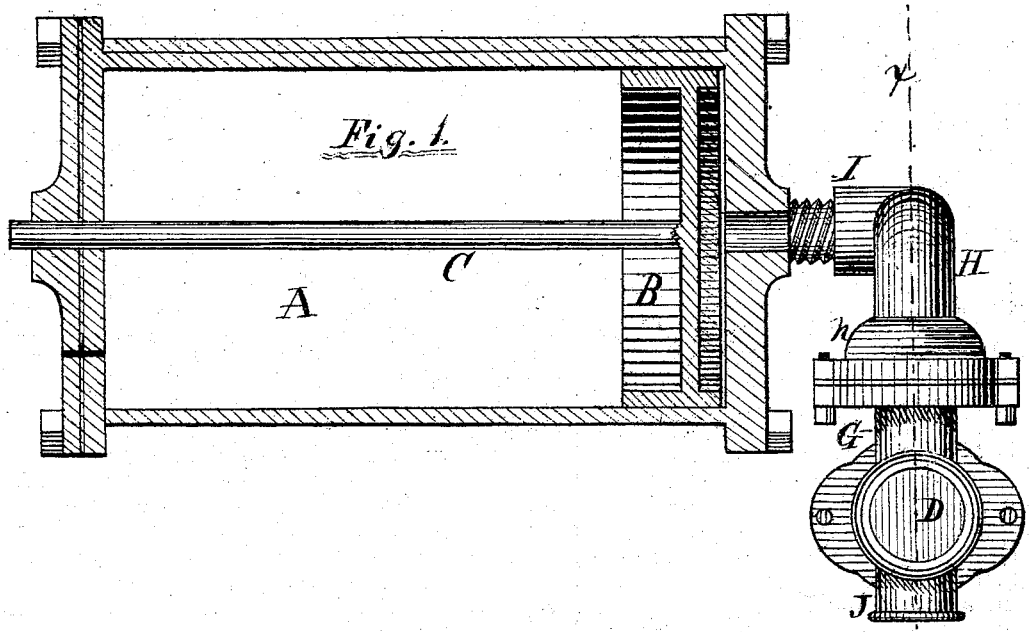
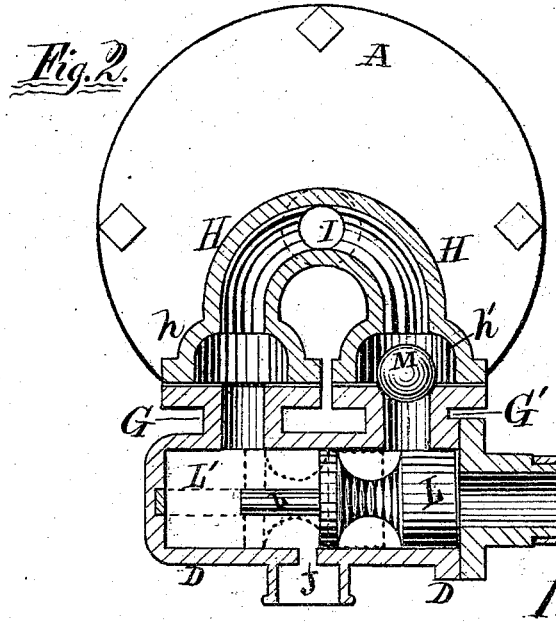
Witnesses:
Platt R. Richards,
J. J. Tunnicliff.
Inventor,
John T. Bassett,
by W. B. Richards,
Atty.

UNITED STATES PATENT OFFICE.

JOHN T. BASSETT, OF GALESBURG, ILLINOIS, ASSIGNOR TO HIMSELF, JOHN BASSLER, AND MARCELLUS S. MATTHEWS, OF SAME PLACE.

IMPROVEMENT IN STEAM-ACTUATED CAR-BRAKES.

Specification forming part of Letters Patent No. 119,913, dated October 17, 1871.

*To all whom it may concern:*

Be it known that I, JOHN T. BASSETT, of Galesburg, county of Knox, State of Illinois, have invented certain Improvements in Steam-Actuated Car-Brakes, of which the following is a specification:

The nature of my invention relates to improvements in that class of steam-actuated car brakes in which the steam is carried back to a brake-operating cylinder beneath each car by a pipe from the engine. It also relates to that class of brakes in which the power of the steam is used to condense atmospheric air at the engine, which is then led by pipe or pipes to brake-operating cylinders below the different cars of the train; and the invention consists in an arrangement of valves between the brake-operating cylinder and the conducting-pipes, such as to allow a free passage for either the steam or air from the engine into the brake-cylinder, and so arranged that the air contained in the brake-cylinder may escape through said valve arrangement at the instant that the pressure from the engine ceases and the back-flow of the steam or air commences, and thus release the brakes without waiting for the steam or air to flow back to the engine for escape, all as hereinafter fully described.

Figure 1 is an end view of my invention, showing the brake-cylinder to which it is attached in section. Fig. 2 is a sectional view of Fig. 1 on the plane of the line $x\ x$, seen from the right-hand end.

A is the brake-operating cylinder, constructed in the usual manner, for use with compressed air. B is the piston, and C the piston-rod, for transmitting the power of the compressed air in the cylinder A to the car-brakes in the usual manner. D is a short pipe, to which the flexible pipe E is attached at one end, the other end being connected with the main pipe leading from the engine. G G' are two short pipes communicating with the pipe D at each end. H is an arched pipe, its ends enlarged to form valve-chambers $h\ h'$, which correspond with and are attached by gasket-joints to the upper ends of the pipes G G'. I is a short pipe communicating with and extending from the upper and central portion of the arched pipe H to the central portion of the head of the cylinder A. J is an opening in the lower side of the pipe D. L is a piston-valve in the pipe or cylinder D. M is a ball-valve in the valve-chamber $h'$.

The operation of my invention is as follows: The compressed air or steam is let on from the engine, and, passing from the main pipe through the pipe E, enters the end of pipe D and drives the piston-valve L back to the position shown by the dotted lines L', thereby opening the passage to the lower end of the pipe G', through which the air ascends, and, raising the valve M, passes through the pipes H and I into the cylinder A, driving before it the piston B and rod C, which is connected with the brake-levers, and by said movement operates them. The moment that the pressure at the engine is cut off and the back pressure commences, the valve M will be driven to its seat, and the pressure against the rear end of the valve L will drive it to the right, opening the passage J and allowing the compressed air in the cylinder A to escape by pipes I, H, D, and J; and as the air escapes from said cylinder A the piston B will slide back to the position shown in the drawing, thus releasing the brakes on each car and on the most distant car from the engine almost instantly—a thing impossible in trains of six or eight cars, and where the air must pass from the most distant car from the engine back to the engine and escape before the brakes are released. The gasket-joints between the valve-chambers $h$ and $h'$ and the pipes G and G' may be loosened, and, by turning the pipe D end for end and again attaching said gasket-joints, the air may be received from the opposite direction to that shown by the drawing.

I claim—

1. The eduction J, operated, in the manner substantially as described, by pipes D, G, H, and I and valves L and M, for the purpose of allowing the steam or air to escape from each cylinder of steam or air-actuated car-brakes, substantially as set forth.

2. The valve devices D G H L M, when interposed between and arranged to operate with the brake-cylinder A B and pipe E, for the purpose specified.

3. The combination of pipes D, G, H, and I and valves L M with the brake-cylinder A B and eduction J, substantially as and for the purpose specified.

JOHN T. BASSETT.

Witnesses:
P. R. RICHARDS,
J. J. TUNNICLIFF.